United States Patent
Derneryd et al.

(10) Patent No.: US 9,660,698 B2
(45) Date of Patent: May 23, 2017

(54) LEAKY CABLE COMMUNICATION

(71) Applicant: TELEFONAKTIEBOLAGET L M ERICSSON (PUBL), Stockholm (SE)

(72) Inventors: Anders Derneryd, Göteborg (SE); Andreas Nilsson, Göteborg (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 0 days.

(21) Appl. No.: 14/787,703

(22) PCT Filed: May 29, 2013

(86) PCT No.: PCT/EP2013/061041
§ 371 (c)(1),
(2) Date: Oct. 28, 2015

(87) PCT Pub. No.: WO2014/191030
PCT Pub. Date: Dec. 4, 2014

(65) Prior Publication Data
US 2016/0112095 A1     Apr. 21, 2016

(51) Int. Cl.
*H04B 5/00*     (2006.01)
*H01Q 1/00*     (2006.01)
*H01Q 13/20*     (2006.01)

(52) U.S. Cl.
CPC .......... *H04B 5/0018* (2013.01); *H01Q 1/007* (2013.01); *H01Q 13/203* (2013.01)

(58) Field of Classification Search
CPC .......... H04B 5/0018; H04B 3/36; H04B 3/38; H04L 25/20; H01Q 13/203
See application file for complete search history.

(56) References Cited

U.S. PATENT DOCUMENTS 5,018,165 A *    5/1991    Sohner .................... H04B 1/69
                                                        375/133
2005/0215277 A1    9/2005    Waye
(Continued)

FOREIGN PATENT DOCUMENTS

GB        2242338 A      9/1991
WO     2013091717 A1     6/2013

OTHER PUBLICATIONS

Notification of Transmittal of the International Search Report and Written Opinion dated Feb. 19, 2014, in International Application No. PCT/EP2013/061041, 12 pages.
(Continued)

*Primary Examiner* — Jean B Corrielus
(74) *Attorney, Agent, or Firm* — Rothwell, Figg, Ernst & Manbeck, P.C.

(57) ABSTRACT

The present invention relates to a wireless communication arrangement comprising a node and a leaky cable running between a first and second converter arrangement. The first converter arrangement connects a first downlink signal and a second downlink signal to the cable, and converts the second downlink signal from a first frequency to a second frequency. The cable's other end is connected to the second converter arrangement which converts the second downlink signal from the second frequency to the first frequency. The second converter arrangement also converts a first uplink signal from a third frequency to a fourth frequency. The first converter arrangement receives the converted first uplink signal from the second converter arrangement and converts it from the fourth frequency to the third frequency. The first frequency is separated from the second frequency, and the third frequency is separated from the fourth frequency.

16 Claims, 8 Drawing Sheets

(56) References Cited

U.S. PATENT DOCUMENTS

2012/0207065 A1    8/2012  Shida
2014/0375525 A1\*  12/2014  Shi .................... H01Q 21/0037
                                                  343/893

OTHER PUBLICATIONS

Jonas Medbo et al. "Leaky coaxial cable MIMO performance in an indoor office environment", Personal Indoor and Mobile Radio Communications (PIMRC), 2012 IEEE 23rd International Symposium on, IEEE, Sep. 9, 2012 (Sep. 9, 2012), pp. 2061-2066, XP032272886, DOI: 10.1109/PIMRC.2012.6362694 ISBN: 978-1-4673-2566-0.

\* cited by examiner

LEAKY CABLE COMMUNICATION

CROSS REFERENCE TO RELATED APPLICATION(S)

This application is a 35 U.S.C. §371 National Phase Entry Application from PCT/EP2013/061041, filed May 29, 2013, designating the United States, the disclosure of which is incorporated herein in its entirety by reference.

TECHNICAL FIELD

The present invention relates to a wireless communication arrangement which comprises a node and at least one signal transfer arrangement. Each signal transfer arrangement comprises a cable, a first converter arrangement and a second converter arrangement. For each signal transfer arrangement the cable is arranged to transfer signals to and from the node. The cable has a first end connected to the node via the first converter arrangement and a second end connected to the second converter arrangement. The cable further comprises a plurality of radiating elements along its length, enabling the cable to transmit and receive signals via said radiating elements.

The present invention also relates to a corresponding method for transferring signals to and from a node via at least one radiating cable having a first end and a second end.

BACKGROUND

A large part of the traffic load in future wireless communication systems is expected to originate from indoor users, for example from users in office buildings, cafés, shopping malls etc. Providing the indoor users with high bit-rate and spectrally efficient communication from outdoor base stations is challenging due to the penetration loss that is experienced by signals propagating through building walls. One well-known solution for enhancing the indoor coverage is to use outdoor-to-indoor repeaters. An outdoor-to-indoor repeater has a pick-up antenna on the outside of the building connected via a double-directional power amplifier to a donor antenna on the inside of the building.

Another well-known solution is to deploy pure indoor systems for example by deploying an indoor radio base station (RBS) and connect it to a distributed antenna system (DAS) where the antennas are also located indoors and close to the users. As an alternative to the use of DAS, leaky cables, for example coaxial cables, may be used.

Typical use cases for leaky cables are indoor deployments and along railway tunnels. Generally, a leaky cable may be constituted by a coaxial cable with slots or gaps along its entire length which enables the cable to radiate electromagnetic waves. Such a cable exhibits radiation properties different to a DAS, such as for example more uniform signal levels over the coverage area. A leaky cable can be used to both transmit and receive electromagnetic waves, i.e. it allows two-way communication. Indoor areas are typically rich scattering environments that allow Multiple Input Multiple Output (MIMO) communication.

Leaky cables are relatively expensive and cumbersome to install due to their high weight and stiff profile. In multi-stream applications such as MIMO communications, multiple cables need to be installed more or less in parallel which complicates the installation even more. MIMO communications are typically applicable indoors where high bit rates are sought after. Since a leaky cable leaks energy along its entire length, it has a high degree of attenuation per meter, which means that the signal to noise ratio (SNR) experienced by a user device located close to the end of the leaky cable is much less than if it was located at the beginning of the leaky cable. This leads to a very skew capacity distribution along the cable, which is very much undesired.

One way to combat this skewness is to introduce multiple radio frequency (RF) amplifiers or repeaters along the leaky cable, being arranged to amplify the signal propagating through the cable as described in for example EP 0442259. The major drawback is that such a solution is expensive and that a power source at each installation point is needed, which largely complicates the installation.

It is therefore a desire to provide an uncomplicated communication arrangement with a leaky cable where there is a more uniform capacity distribution along the cable than previously known such systems.

SUMMARY

It is an object of the present invention to provide an uncomplicated communication arrangement with a leaky cable where there is a more uniform capacity distribution along the cable than previously known such systems.

Said object is obtained by means of a wireless communication arrangement which comprises a node and at least one signal transfer arrangement. Each signal transfer arrangement comprises a cable, a first converter arrangement and a second converter arrangement. For each signal transfer arrangement the cable is arranged to transfer signals to and from the node. The cable has a first end connected to the node via the first converter arrangement and a second end connected to the second converter arrangement. The cable further comprises a plurality of radiating elements along its length, enabling the cable to transmit and receive signals via said radiating elements. For each signal transfer arrangement:

The first converter arrangement is arranged to connect at least a first downlink signal and a second downlink signal to the cable via the first end, and to convert the second downlink signal from a first frequency to a second frequency before entering the cable.

The second converter arrangement is arranged to convert the second downlink signal from the second frequency to the first frequency and to re-send it into the cable via the second end.

The second converter arrangement is arranged to convert a first part of at least a first uplink signal from a third frequency to a fourth frequency and to re-send it into the cable via the second end.

The first converter arrangement is arranged to convert the first part of said first uplink signal from the fourth frequency to the third frequency.

The first frequency is separated from the second frequency, and the third frequency is separated from the fourth frequency.

Said object is also obtained by means of a method for transferring signals to and from a node via at least one radiating cable having a first end and a second end. For each radiating cable, the method comprises the steps:

converting a second downlink signal from a first frequency to a second frequency;
connecting at least a first downlink signal and the second downlink signal to the cable via the first end;
at the second end of the cable, converting the second downlink signal from the second frequency to the first frequency;
re-sending the second downlink signal into the cable;

converting a first part of at least a first uplink signal from a third frequency to a fourth frequency;

re-sending the first part of said first uplink signal into the cable via the second end; and converting the first part of said first uplink signal from the fourth frequency to the third frequency.

The first frequency is separated from the second frequency, and the third frequency is separated from the fourth frequency.

According to an example, for each signal transfer arrangement:

The second converter arrangement comprises a third frequency converter device, arranged to convert the first part of said first uplink signal, having entered the second converter arrangement at the third frequency via the second end, from the third frequency to the fourth frequency.

The first converter arrangement comprises a fourth frequency converter device arranged to convert the first part of said first uplink signal from the second converter arrangement, from the fourth frequency to the third frequency.

As an alternative, the second frequency converter device is arranged to convert the first part of said first uplink signal, having entered the second converter arrangement at the third frequency via the second end, from the third frequency to the fourth frequency. Furthermore, the first frequency converter device is arranged to convert the first part of said first uplink signal from the second converter arrangement, from the fourth frequency to the third frequency.

As another alternative, the second converter arrangement comprises a third frequency converter device, arranged to convert the first part of said first uplink signal, having entered the second converter arrangement at the third frequency via the second end, from the third frequency to the fourth frequency. Furthermore, the first converter arrangement comprises a fourth frequency converter device arranged to convert the first part of said first uplink signal from the second converter arrangement, from the fourth frequency to the third frequency.

According to another example, least one of the second frequency converter device and the third frequency converter device is connected to an amplifier and/or an additional filter.

According to another example, a second part of the first uplink signal, entering the first converter arrangement transferred at the third frequency, is connected directly to the node via the first filter arrangement.

According to another example, each second converter arrangement may be arranged to convert a first part of a second uplink signal from a third frequency to a fourth frequency and to re-send it into the cable via the second end. The first converter arrangement is arranged to convert the first part of the second uplink signal from the fourth frequency to the third frequency.

According to another example, for at least one signal transfer arrangement, the first downlink signal and second downlink signal are constituted by a main downlink signal. The main downlink signal has been divided into the first downlink signal and the second downlink signal by a power dividing device comprised in the corresponding first converter arrangement.

More examples are disclosed in the dependent claims.

A number of advantages are obtained by means of the present invention, mainly fewer cables are needed when deploying leaky cable systems with MIMO, e.g. only one leaky cable can support a 2×2 MIMO system and four leaky cables can support an 8×8 MIMO deployment. Another advantage is that the capacity becomes more evenly distributed along the coverage area.

BRIEF DESCRIPTION OF THE DRAWINGS

The present invention will now be described more in detail with reference to the appended drawings, where.

DETAILED DESCRIPTION

Figure 1:
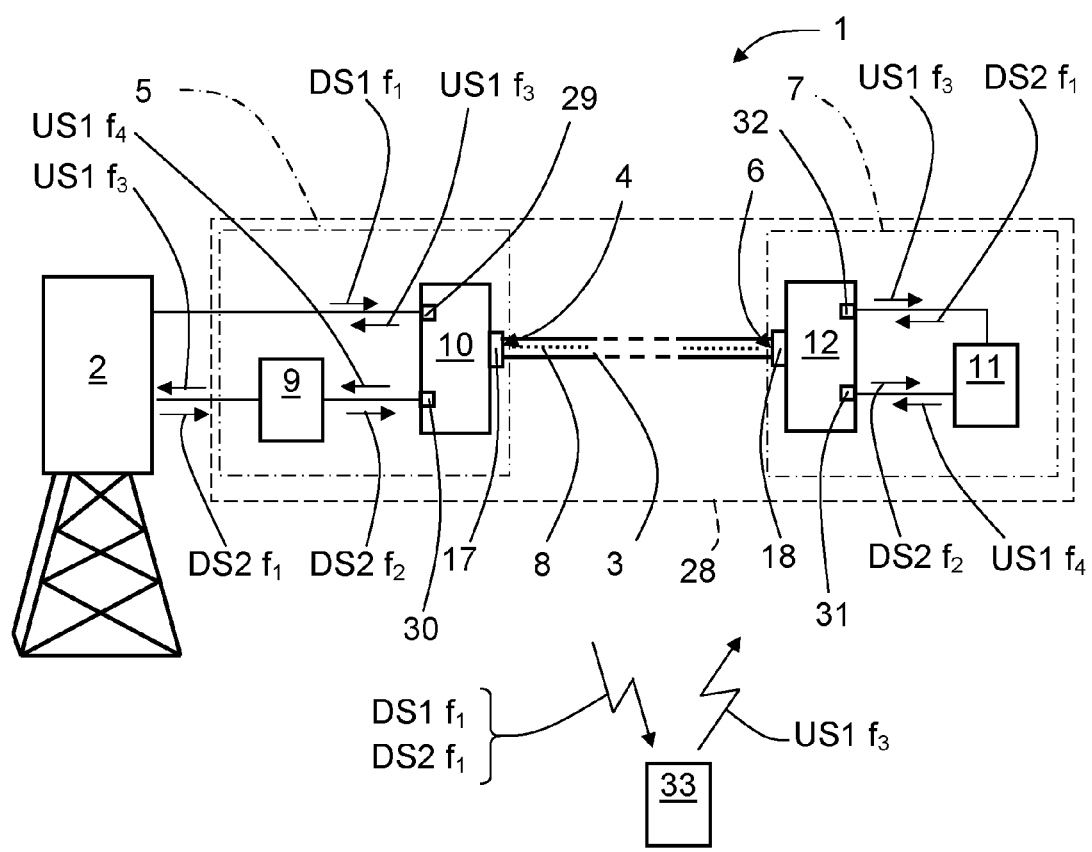
FIG. 1 shows a schematic view of a wireless communication arrangement according to a first example.

With reference to FIG. 1, showing a first example, there is a wireless communication arrangement 1 comprising a node 2 and one signal transfer arrangement 28. The signal transfer arrangement 28 comprises a cable 3, a first converter arrangement 5 and a second converter arrangement 7. The cable 3, which is in the form of a so-called leaky cable, is arranged to transfer signals to and from the node 2, where the cable 3 has a first end 4 connected to the node 2 via the first converter arrangement 5, and a second end 6 connected to the second converter arrangement 7. The cable 3 further comprises a plurality of radiating elements 8 along its length enabling the cable 3 to transmit and receive signals via said radiating elements 8.

According to the present invention, the first converter arrangement 5 is arranged to connect a first downlink signal DS1 and a second downlink signal DS2 to the cable 3 via the first end 4, and to convert the second downlink signal DS2 from a first frequency $f_1$ to a second frequency $f_2$ before entering the cable 3. The first frequency $f_1$ is separated from the second frequency $f_2$.

In this context it should be noted that the frequencies mentioned above and in the following represent frequency bands, each having a centre frequency and a certain bandwidth.

In order to accomplish the above, the first converter arrangement 5 comprises a first frequency converter device 9 and a first filter arrangement 10 connected to the first end 4 via a first cable port 17. The first downlink signal DS1 is connected to the cable 3 via a first converter first filter port 29 at the first filter arrangement 10, and the second downlink signal DS2 is connected to the cable 3 via the first frequency converter device 9 and a first converter second filter port 30 at the first filter arrangement 10. The first frequency converter device 9 is arranged to convert the second downlink signal DS2 from the first frequency $f_1$ to the second frequency $f_2$.

The first downlink signal DS1 and the second downlink signal DS2 now run in the cable 3 from the first converter arrangement 5 towards the second converter arrangement 7. The cable's radiating elements 8 are not adapted to be resonant for any one of the first frequency $f_1$ and the second frequency $f_2$, but may be less resonant for the second frequency $f_2$ than for the first frequency $f_1$. The first downlink signal DS1 radiates out from the cable 3 via the radiating elements 8 and the remaining power of the part of the first downlink signal DS1 that reaches the second converter arrangement 7 is relatively small. The remaining power of the part of the second downlink signal DS2 that reaches the second converter arrangement 7 is relatively high, not having radiated out from the cable 3 via the radiating elements 8 to such a degree as the first downlink signal DS1 and being subject to lower losses in the cable than the first downlink signal DS1 when the second frequency $f_2$ is lower than the first frequency $f_1$.

The second converter arrangement 7 is arranged to convert the second downlink signal DS2 from the second frequency $f_2$ to the first frequency $f_1$ and to re-send it into the cable 3 via the second end 6.

In order to accomplish this, the second converter arrangement 7 comprises a second frequency converter device 11 and a second filter arrangement 12 connected to the second end 6 via a second cable port 18. The second downlink signal DS2 is fed out from the cable 3 through the second end 6 and back into the cable 3 through the second end 6 via the second filter arrangement 12, the second frequency converter device 11 and via the second filter arrangement again 12. The second downlink signal DS2 then first runs through the second filter arrangement 12 via the second cable port 18 and a second converter first filter port 31 and then through the second filter arrangement 12 via a second converter second filter port 32 and the second cable port 18. The second frequency converter device 11 is arranged to convert the second downlink signal DS2 from the second frequency $f_2$ to the first frequency $f_1$.

The second downlink signal DS2 now runs in the cable 3 from the second converter arrangement 7 towards the first converter arrangement 5. The second downlink signal DS2 radiates out from the cable 3 via the radiating elements 8 and the remaining power of the part of the second downlink signal DS1 that reaches the first converter arrangement 7 is relatively small.

This means that, mainly, the first downlink signal DS1 radiates out from the cable 3 when travelling from the first converter arrangement 5 towards the second converter arrangement 7, and the second downlink signal DS2 radiates out from the cable 3 when travelling from the second converter arrangement 7 towards the first converter arrangement 5. In this way, the downlink streams DS1, DS2 together provide a relatively uniform coverage along the cable 3, the downlink signals DS1, DS2 radiating and decaying in different directions.

As shown on FIG. 1, there is a user terminal 33 that receives the radiated downlink signals DS1, DS2 at the first frequency $f_1$. The user terminal 33, might symbolize a plurality of user terminals that may be of different types such as cell phones and lap tops etc. The user terminal transmits a first uplink signal US1 at a third frequency $f_3$; in this particular example that is constituted by a TDD (Time Division Duplex) system, the first frequency $f_1$ and the third frequency $f_3$ are equal.

The first uplink signal is received by the cable's radiating elements 8, and runs in the cable, a first part transferred at the third frequency $f_3$ towards the second converter arrangement 7, and a second part transferred at the third frequency $f_3$ towards the first converter arrangement 5. The second part of the first uplink signal US1 enters the first converter arrangement 5 and is connected directly to the node 2 via the first cable port 17 and the first converter first filter port 29 of the first filter arrangement 10.

The second converter arrangement 7 is arranged to convert the first part of the first uplink signal US1 from a third frequency $f_3$ to a fourth frequency $f_4$ and to re-send it into the cable 3 via the second end 6. The third frequency $f_3$ is separated from the fourth frequency $f_4$.

In order to accomplish this, the second frequency converter device 11 is arranged to convert the first part of the first uplink signal US1, having entered the second converter arrangement 7 at the third frequency $f_3$ via the second end 6, the second cable port 18 and the second converter second filter port 32 of the second filter arrangement 12, from the third frequency $f_3$ to the fourth frequency $f_4$. The converted first part of the first uplink signal US1 is then transferred to the cable 3 again via the second converter first filter port 31 and the second cable port 18.

The first part of the first uplink signal US1 now runs to the first converter arrangement 5, being transferred at the fourth frequency $f_4$. This means that the remaining power of the first part of the first uplink signal US1 that is transferred from the second converter arrangement 7 to the first converter arrangement 5 is relatively high when reaching the first converter arrangement 5 for the same reasons discussed previously, especially when the fourth frequency $f_4$ is lower than the third frequency $f_3$.

The first converter arrangement 5 is arranged to convert the first part of said first uplink signal US1 from the fourth frequency $f_4$ to the third frequency $f_3$.

In order to accomplish this, the first frequency converter device 9 is arranged to convert the first part of the first uplink signal US1 from the second converter arrangement 7, from the fourth frequency $f_4$ to the third frequency $f_3$, the first part of the first uplink signal US1 then being connected to the node 2. The first part of the first uplink signal US1 from the second converter arrangement 7 reaches the first frequency converter device 9 via the first cable port 17 and the first converter second filter port 30 of the first filter arrangement 10.

As an example for the filter arrangements, 10, 12, the first filter arrangement 10 comprises a first diplexer with such filter characteristics that the first frequency $f_1$ and the third frequency $f_3$ may pass between the first cable port 17 and the first converter first port 29. In the same way, the second frequency $f_2$ and the fourth frequency $f_4$ may pass between the first cable port 17 and the first converter second port 30.

Correspondingly, the second filter arrangement 12 comprises a second diplexer with such filter characteristics that the first frequency $f_1$ and the third frequency $f_3$ may pass between the second cable port 18 and the second converter second port 32. In the same way, the second frequency $f_2$ and the fourth frequency $f_4$ may pass between the second cable port 18 and the second converter first port 32.

The first example with reference to FIG. 1 may be constituted by a 2×2 MIMO TDD system, for example deployed in a corridor or in a tunnel. The first frequency converter device 9 is used to convert the second downlink signal DS2 to another carrier frequency, from the first frequency $f_1$ to the second frequency $f_2$. Then the second downlink signal DS2 is transmitted through the cable 3 without interfering with the first downlink signal DS1, where the first downlink signal DS1 radiates a first MIMO stream. The second downlink signal DS2 will radiate somewhat along the cable; it is therefore desired that the frequency band used for the second frequency $f_2$ is free to use in the coverage area, for example within an unlicensed spectrum. In addition, the frequency band used for the second frequency $f_2$ should be selected such that spurious radiation and attenuation along the cable is minimized. Preferably, a low frequency should be selected.

When the frequency converted second downlink signal DS2 reaches the far end of the cable 3, the signal is frequency converted back to its original frequency, the first frequency $f_1$, in the second converter arrangement 7, and then fed back into the second end 6 of the cable 3 which then radiates a second MIMO stream.

Figure 2:
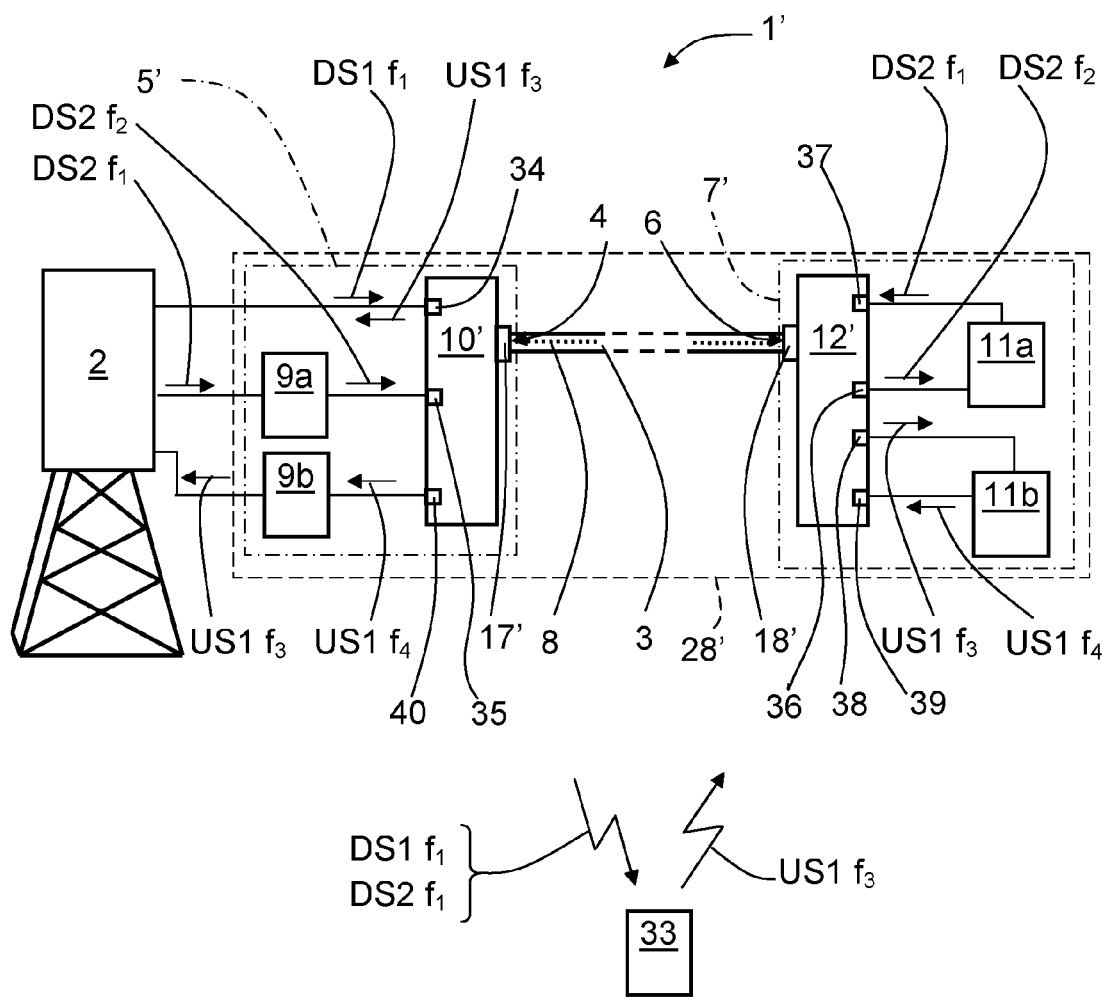
FIG. 2 shows a schematic view of a wireless communication arrangement according to a second example.

With reference to FIG. 2, a second example of a wireless communication arrangement 1' will now be described, the wireless communication arrangement 1' comprising a signal transfer arrangement 28'. In the second example, an FDD (Frequency Division Duplex) system is described, where the first frequency $f_1$ and the third frequency $f_3$ are separated from each other, and where the second frequency $f_2$ and the fourth frequency $f_4$ are separated from each other.

Here, there are two separate frequency converter devices in the first converter arrangement 5'; a first frequency converter device 9a and a fourth frequency converter device 9b. The first frequency converter device 9a is arranged to convert the second downlink signal DS2 from the first frequency $f_1$ to the second frequency $f_2$ before entering the cable 3, the second downlink signal DS2 being transferred at the second frequency $f_2$ from the first frequency converter device 9a to a first cable port 17' of a first filter arrangement 10' via a first converter second filter port 35. The first downlink signal DS1 is transferred from the node 2 at the first frequency $f_1$ directly to the first cable port 17' via a first converter first filter port 34.

The second converter arrangement 7' comprises a second frequency converter device 11a and a third frequency converter device 11b. The second frequency converter device 11a is connected to a second filter arrangement 12' via a second converter first filter port 36 and a second converter second filter port 37, the second frequency converter device 11a being arranged to convert the second downlink signal DS2 from the second frequency $f_2$ to the first frequency $f_1$ and re-send it into the cable 3 as in the first example. The second downlink signal DS2 exits the second filter arrangement 12' via the second converter first filter port 36 and re-enters the second filter arrangement 12' via the second converter first filter port 37.

As in the first example, a user terminal 33 receives the radiated downlink signals DS1, DS2 at the first frequency $f_1$ and transmits a first uplink signal US1 at a third frequency $f_3$. The first uplink signal US1 is received by the cable's radiating elements 8, and runs in the cable 3, a first part transferred at the third frequency $f_3$ towards a second converter arrangement 7', and a second part transferred at the third frequency $f_3$ towards the first converter arrangement 5'. The second part of the first uplink signal US1 enters the first converter arrangement 5' and is connected directly to the node 2 via the first cable port 17' and the first converter first filter port 34 of the first filter arrangement 10'.

The third frequency converter device 11b is connected to the second filter arrangement 12' via a second converter third filter port 38 and a second converter fourth filter port 39. The third frequency converter device 11b is arranged to convert the first part of the first uplink signal US1, having entered the second converter arrangement 7' at the third frequency $f_3$ via the second end 6, from the third frequency $f_3$ to the fourth frequency $f_4$. The first part of the first uplink signal US1 exits the second filter arrangement 12' via the second converter third filter port 38, and re-enter the second filter arrangement 12' via the second converter fourth filter port 39.

In the second example, the second frequency converter device 11a only converts the second downlink signal DS2, and the third frequency converter device 11b only converts the first part of the first uplink signal US1. This means that the second filter arrangement 12' is arranged in such a way that the first frequency $f_1$ may pass from the second converter second filter port 37 to the second cable port 18', the second frequency $f_2$ may pass from the second cable port 18' to the second converter first filter port 36, the third frequency $f_3$ may pass from the second cable port 18' to the second converter third filter port 38 and the fourth frequency $f_4$ may pass from the second converter fourth filter port 39 to the second cable port 18'.

Finally, the first part of the first uplink signal US1 that is re-transmitted at the fourth frequency $f_4$, enters the fourth frequency converter device 9b in the first converter arrangement 5' via the first cable port 17', the first filter arrangement 10' and a first converter third filter port 40. The fourth frequency converter device 9b is arranged to convert said first part of the first uplink signal US1 from the fourth frequency $f_4$ to the third frequency $f_3$. The converted first uplink signal US1 is further connected to the node 2.

In the second example, the first frequency converter device 9a only converts the second downlink signal DS2, and the fourth frequency converter device 9b only converts the first part of the first uplink signal US1. This means that the first filter arrangement 10' is arranged in such a way that the first frequency $f_1$ and the third frequency $f_3$ may pass between the first converter first filter port 34 and the first cable port 17', the second frequency $f_2$ may pass from the first converter second filter port 35 to the first cable port 17', and the fourth frequency $f_4$ may pass from the first cable port 17' to the first converter third filter port 40.

In the second example, the filter arrangements 10', 12' are in the form of multiplexers, each multiplexer may for example comprise three diplexers. The exact configuration of the multiplexers are not described in detail here, but is easily understood by the skilled person, and may vary depending on which technology and design that is used.

Since all frequencies in this example are separated from each other, and thus unequal due to the system being a FDD system, there is a need for two separate frequency converter devices 9a, 9b; 11a, 11b in each converter arrangement 5', 7'.

Figure 3:
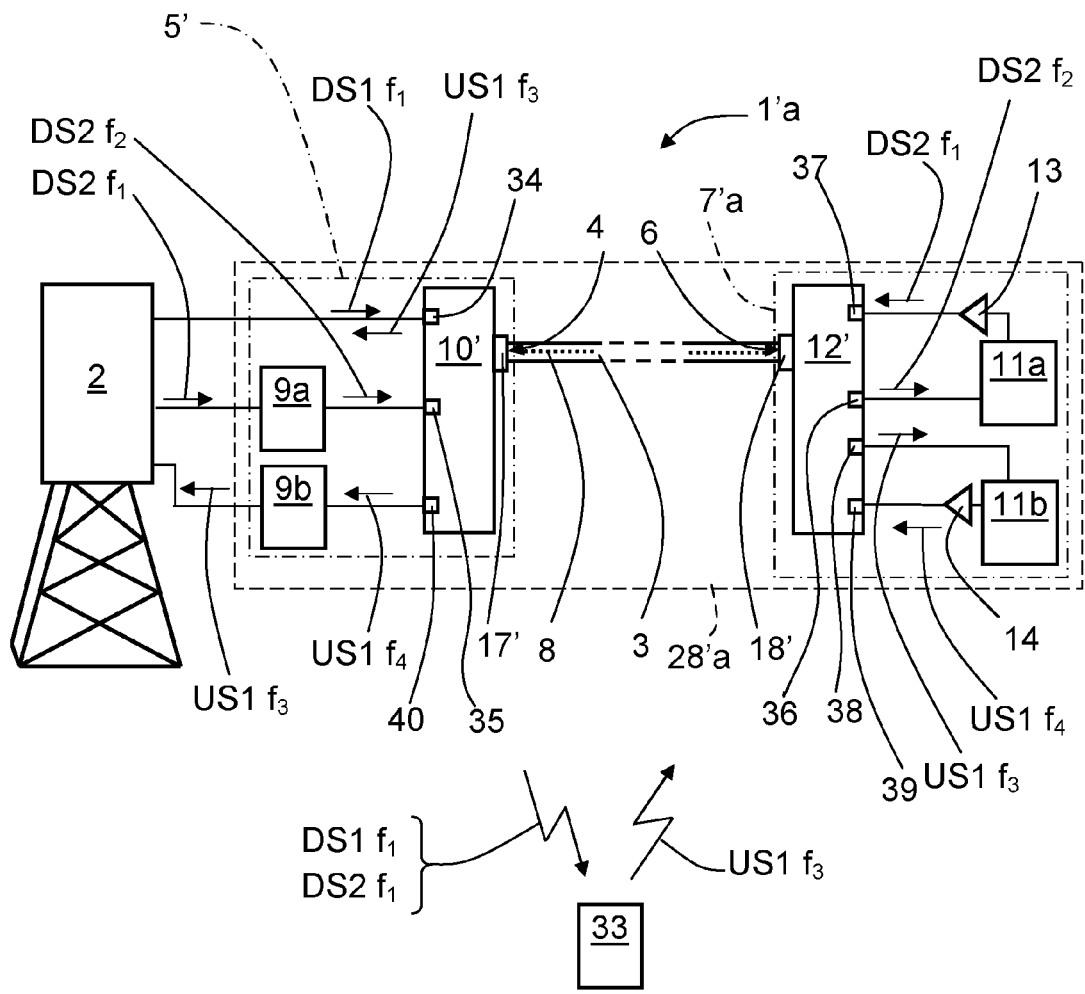
FIG. 3 shows a schematic view of a wireless communication arrangement according to a third example.

In FIG. 3, a third example of a wireless communication arrangement 1'a will now be described, the wireless communication arrangement 1'a comprising a signal transfer arrangement 28'a. This example is similar to the second example, except that in the second converter arrangement 7'a there is a first amplifier 13 positioned between the second frequency converter device 11a and the second converter second filter port 37 and a second amplifier 14 positioned between the third frequency converter device 11b and the second converter fourth filter port 39. These amplifiers 13, 14 are used to enhance the power of the outgoing frequency converter signals DS2, US1.

Figure 4:
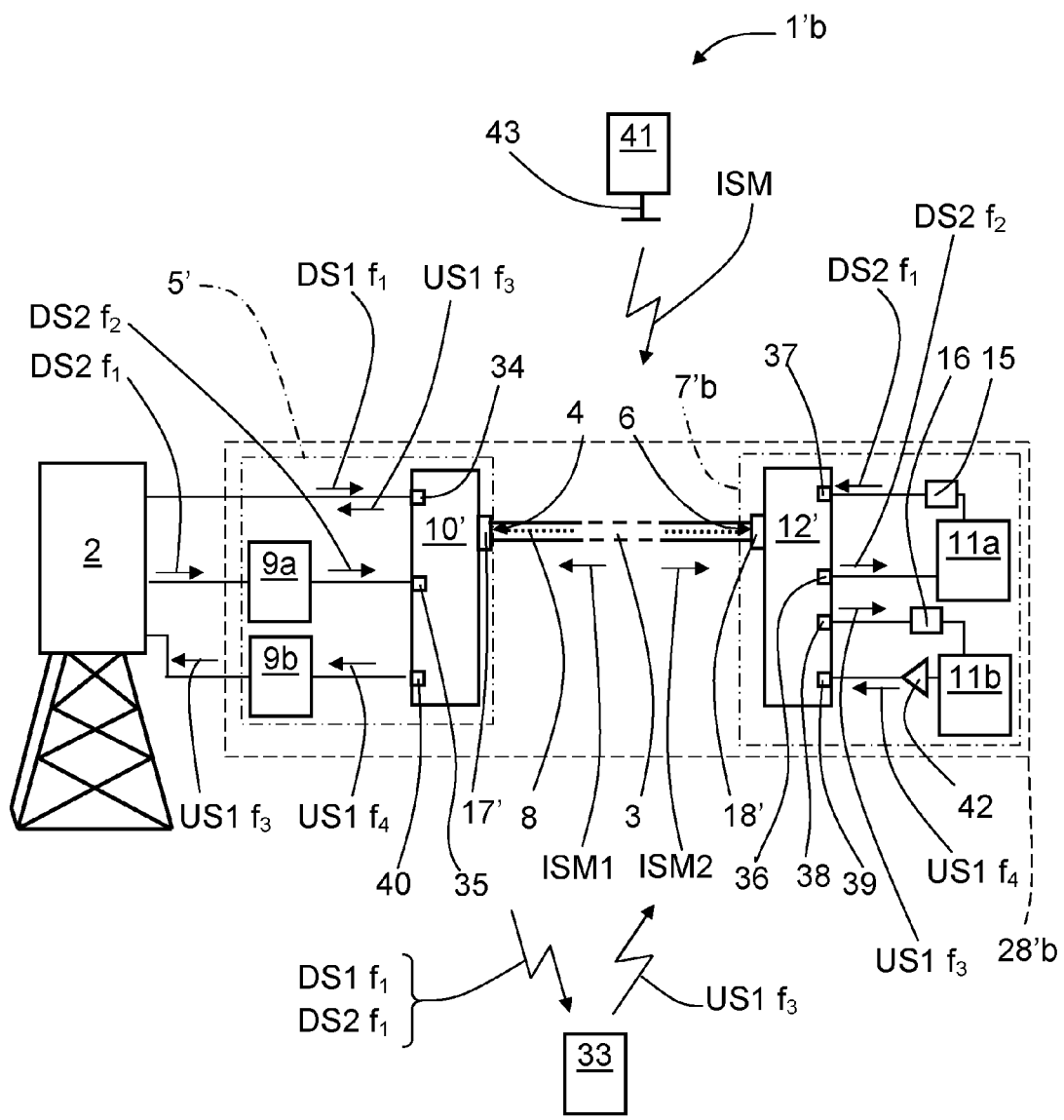
FIG. 4 shows a schematic view of a wireless communication arrangement according to a fourth example.

With reference to FIG. 4, a numerical example is presented for a fourth example with a configuration of a wireless communication arrangement 1'b comprising a signal transfer arrangement 28'b similar to the one shown in FIG. 2 and FIG. 3. Here, in the second converter arrangement 7'b a first filter 15 is positioned between the second frequency converter device 11a and the second converter second filter port 37, a second filter 16 positioned between the third frequency converter device 11b and the second converter third filter port 38 and a low noise amplifier 42 is positioned between the third frequency converter device 11b and the second converter fourth filter port 39.

In this example, the leaky cable 3 is 100 m long and the output power of the communication arrangement 1'b is assumed to be 30 dBm per signal stream. An interfering device 41 with a dipole antenna 43 is located 0.5 meter from the leaky cable 3 and is transmitting signals with 30 dBm at the ISM (Industrial, Scientific and Medical) frequency band. Some part of the interfering signal ISM will be received by the leaky cable 3 and cause a first interfering signal ISM1 running towards the first converter arrangement 5'b and a second interfering signal ISM2 running towards the second converter arrangement 7'b.

The coupling loss for the leaky cable is assumed to be 76 dB for a dipole antenna located 2 m away from a leaky cable. In this case the dipole antenna 43 is only located 0.5 m away from the leaky cable 3, hence the coupling loss for this scenario is only 64 dB. The second interfering signal ISM2 will interfere with the second downlink signal DS2 that is transferred at the second frequency $f_2$. However due to the high coupling loss for the interfering signal ISM from the dipole 43 to the leaky cable 3, the power of the second interfering signal ISM2 would be about 60 dB less than power of said second downlink signal DS2, and hence not affect the performance of said second downlink signal DS2. Said second downlink signal DS2 will then be frequency converted up to the original first frequency $f_1$ and re-sent via the cable 3 towards the node 2 as described for the previous examples. The attenuation along the cable 3 is assumed to be 3.15 dB/100 m. The first filter 15 and the second filter 16 are used to reduce the risk of out of band radiation after the second frequency converter 11a and the third frequency converter 11b.

The first interfering signal ISM1 will interfere with the first part of the first uplink signal US1 that is transferred to the fourth frequency $f_4$. The low noise amplifier 41 is used to minimize the effect of the first interfering signal ISM1 on the performance of the second part of the first uplink signal US1.

Figure 5:
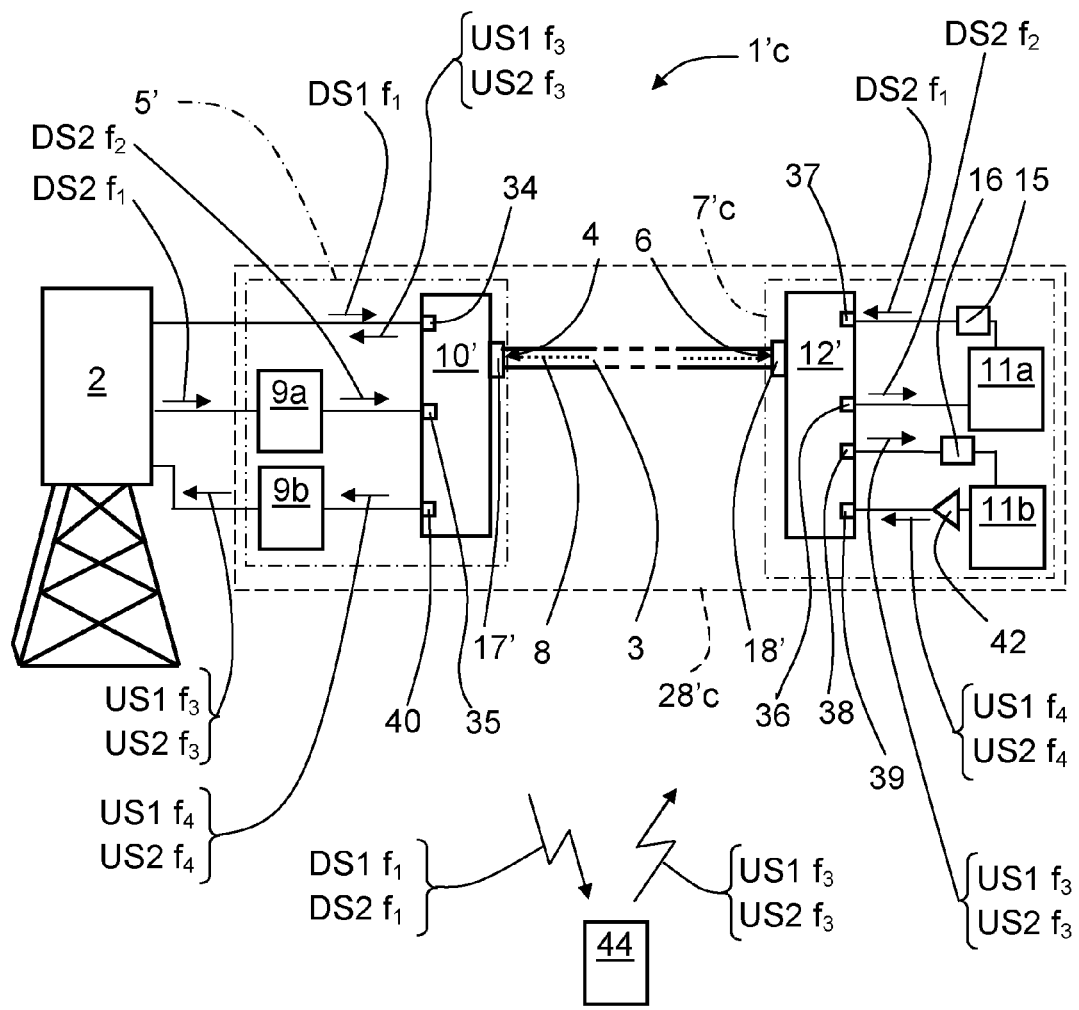
FIG. 5 shows a schematic view of a wireless communication arrangement according to a fifth example.

With reference to FIG. 5, showing a fifth example of a wireless communication arrangement 1'c, the wireless communication arrangement 1'c comprises a signal transfer arrangement 28'c. This example has a configuration of the wireless communication arrangement 1'b that is similar to the one in the fourth example. However, here there is a user terminal 44 that might symbolize a plurality of user terminals that may be of different types such as cell phones and lap tops etc. The user terminal 44 receives the radiated downlink signals DS1, DS2 at the first frequency $f_1$ and transmits a first uplink signal US1 at the third frequency $f_3$ as previously described. Here, the user terminal is also arranged to transmit a second uplink signal US2 at the third frequency $f_3$. The second uplink signal US2 is received by the cable 3 and processed in the wireless communication arrangement 1'c in the same manner as the first uplink signal US1.

This means that the second converter arrangement 7'c is arranged to convert a first part of a second uplink signal US2 from the third frequency $f_3$ to the fourth frequency $f_4$ and to re-send it into the cable 3 via the second end 6, and that the first converter arrangement 5'c is arranged to convert the first part of the second uplink signal US2 from the fourth frequency $f_4$ to the third frequency $f_3$. In this way, two separate MIMO streams are present and taken care of.

Figure 6:
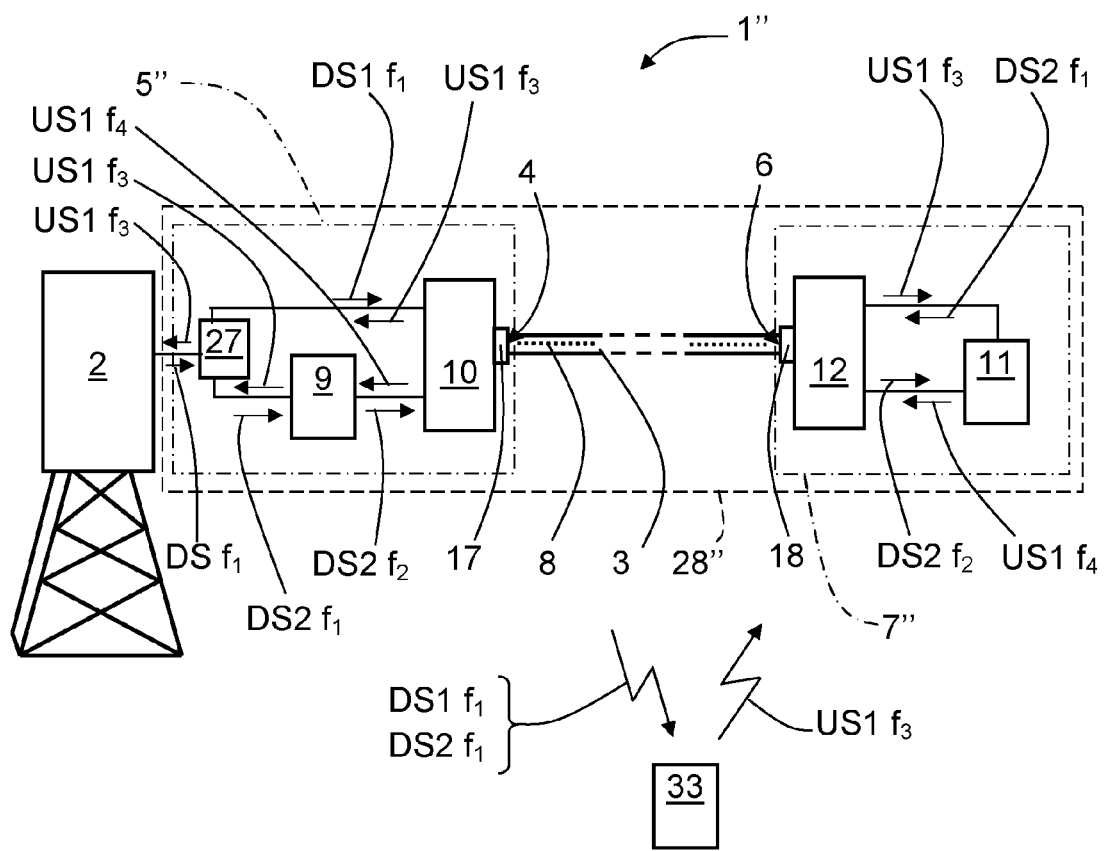
FIG. 6 shows a schematic view of a wireless communication arrangement according to a sixth example.

With reference to FIG. 6, showing a sixth example of a wireless communication arrangement 1", the wireless communication arrangement 1" comprises a signal transfer arrangement 28". In this example, the first downlink signal DS1 and the second downlink signal DS2 are constituted by a main downlink signal DS that has been divided into the first downlink signal DS1 and the second downlink signal DS2 by a power dividing device 27 comprised in the corresponding first converter arrangement 5". Except for the power dividing device 27, the wireless communication arrangement 1" according to the sixth example corresponds to the wireless communication arrangement according to the first example, and all uplink and downlink signals are processed in the same way as in the first example.

The sixth example illustrates a TDD SISO (Single Input Single Output) system, where there is only one signal stream for uplink and one signal stream for downlink. In other words, in the sixth example the main downlink signal stream DS is divided into two parts DS1, DS2. The first part DS1 is directly fed into the cable at the node 2 while the second part DS2 first is frequency converted into a lower second frequency $f_2$ in order to reduce the attenuation along the cable 3. When the frequency converted downlink signal stream DS2 arrives at the second end 6 of the cable 2, that stream is frequency converted back to the original first frequency $f_1$ and then fed back into the second end 6 of the cable 3. The second part of the uplink signal stream US1 is frequency converted in a similar way and fed to the node 2 via the cable 3 at the fourth frequency $f_4$. At the node side, the second part of the uplink signal stream US1 is converted back to the original third frequency $f_3$. The advantage of this example is that the capacity will become more evenly distributed along the cable 3. Since it is a TDD system, in this example the first frequency $f_1$ and the third frequency $f_3$ are equal, and the second frequency $f_2$ and the fourth frequency $f_4$ are equal.

Figure 7:
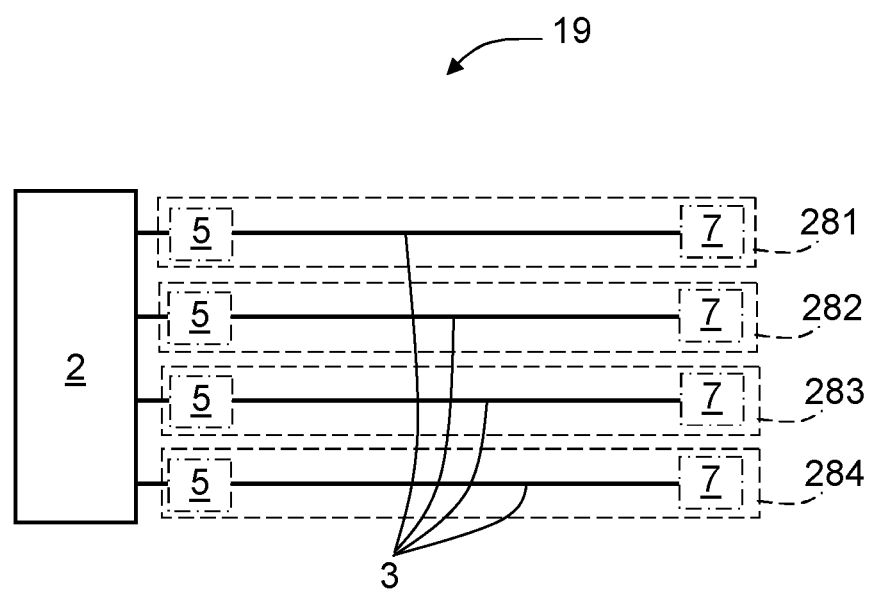
FIG. 7 shows a schematic view of a wireless communication arrangement according to a seventh example.

With reference to FIG. 7, showing a seventh example of a wireless communication arrangement 19, where a node 2 is connected to a first signal transfer arrangement 281, a second signal transfer arrangement 282, a third signal transfer arrangement 283 and a fourth signal transfer arrangement 284. Each signal transfer arrangement 281, 282, 283, 284 may for example be of any of the types of signal transfer arrangements 28, 28', 28'a, 28'b, 28'c, 28" described above. Other types of signal transfer arrangements are of curse conceivable. In this manner, many signal streams in uplink and downlink may be handled; in this example 8×8 MIMO may be handled. In this example, the converter arrangements 5, 7 of the first example are indicated in FIG. 7, but this is only an example; any type of converter arrangements may be used.

Figure 8:
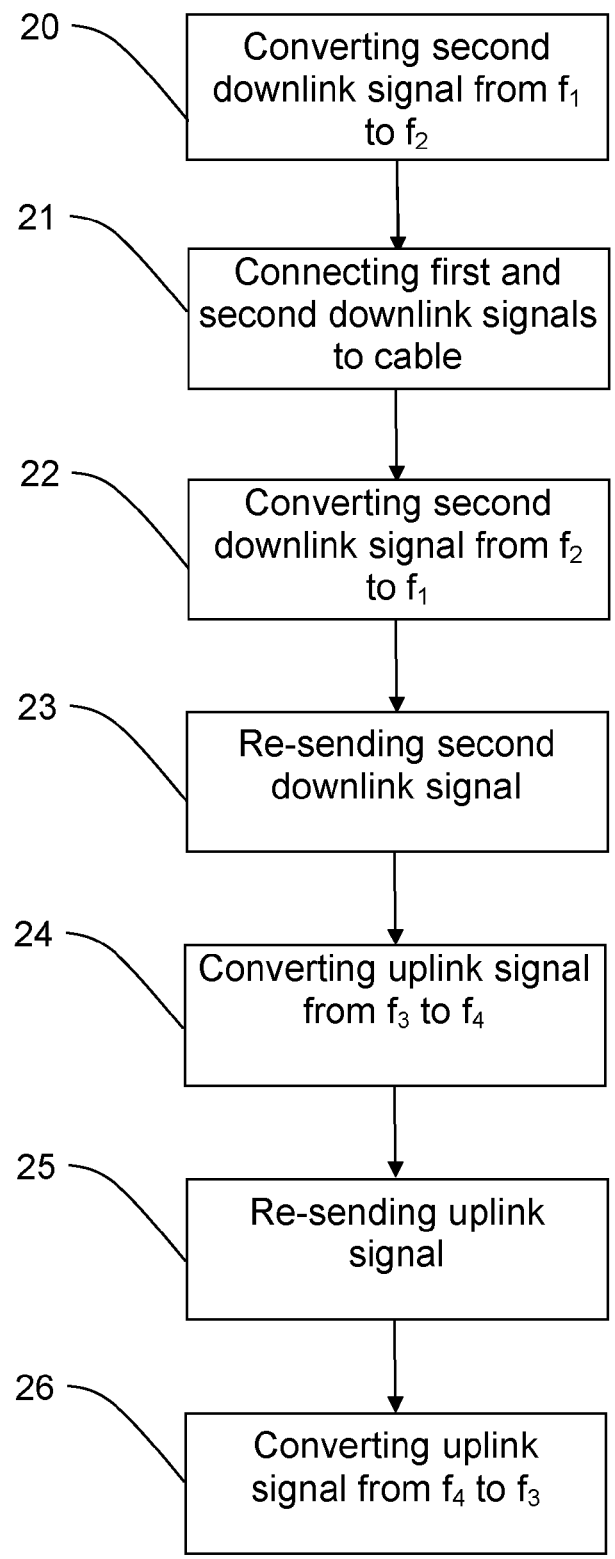
FIG. 8 shows a flowchart for a method according to the present invention.

With reference to FIG. 8, the present invention relates to a method for transferring signals to and from a node 2 via at least one radiating cable 3 having a first end 4 and a second end 6, the method comprising the steps for each radiating cable 3:

20: converting a second downlink signal DS2 from a first frequency $f_1$ to a second frequency $f_2$;

21: connecting at least a first downlink signal DS1 and the second downlink signal DS2 to the cable 3 via the first end 4;

22: at the second end 6 of the cable 3, converting the second downlink signal DS2 from the second frequency $f_2$ to the first frequency $f_1$;

23: re-sending the second downlink signal DS2 into the cable 3;

24: converting a first part of at least a first uplink signal US1 from a third frequency $f_3$ to a fourth frequency $f_4$;

25: re-sending the first part of said first uplink signal US1 into the cable 3 via the second end 6; and 26: converting the first part of said first uplink signal US1 from the fourth frequency $f_4$ to the third frequency $f_3$.

The first frequency $f_1$ is separated from the second frequency $f_2$, and the third frequency $f_3$ is separated from the fourth frequency $f_4$.

The present invention is not limited to the examples above, but may vary freely within the scope of the appended claims. For example, the node 2 may be of any suitable type, for example a base station or a repeater.

Both TDD and FDD systems have been described, having different features. It is to be understood that the wireless communication arrangement described have been examples, and that combinations of these examples and many other types of wireless communication arrangement are conceivable. For example, a user terminal that is arranged to both send and receive a plurality of different signal streams may be applied for any type of wireless communication arrangement. The number, placement and character of additional amplifiers and filters may be any suitable.

Furthermore, there may be any number of signal streams in uplink as well as downlink. There may be any number of signal transfer arrangement, which is necessary to handle many signal streams.

The intermediate second and fourth frequencies $f_2$, $f_4$ that the signals are converted to may be of any suitable magnitude, lower or higher than the original first and third frequencies $f_1$, $f_3$. An advantage with having intermediate second and fourth frequencies $f_2$, $f_4$ that are lower than the original first and third frequencies $f_1$, $f_3$ is that the lower frequency at which the signals are transferred in the cable 3, the lower the ohmic losses in the cable become.

There may be more than the mentioned first downlink signal DS1 and the second downlink signal DS2 that are processed in the corresponding signal transfer arrangement. In the same way, there may be more than the mentioned first uplink signal US1 and the second uplink signal DS2 that are processed in the corresponding signal transfer arrangement.

The frequency converter devices may be constituted by any suitable type of frequency mixers.

The signals indicated in the figures are those that are needed for explaining the present invention; reflections and signals that no longer have a significant magnitude and/or importance are not indicated for reasons of clarity. For example, when the second downlink signal DS2 has been transferred at the first frequency $f_1$, from the second converter arrangement 7 to the first converter arrangement 5 while radiating out from the cable 3, the part of that signal that enters the first converter arrangement 5 and passes the first filter arrangement 10 is not indicated for the above reasons.

The invention claimed is:

1. A wireless communication arrangement comprising:
   a node; and
   at least one signal transfer arrangement, each signal transfer arrangement including a cable, a first converter arrangement and a second converter arrangement, where for each signal transfer arrangement the cable is arranged to transfer signals to and from the node, said cable having a first end connected to the node via the first converter arrangement and a second end connected to the second converter arrangement, the cable further including a plurality of radiating elements along its length enabling the cable to transmit and receive signals via said radiating elements, wherein, for each signal transfer arrangement:
   (i) the first converter arrangement is configured to connect at least a first downlink signal and a second downlink signal to the cable via the first end, to transmit the first downlink signal at the first frequency on the cable to the second converter arrangement, and to convert the second downlink signal from a first frequency to a second frequency before entering the cable,
   (ii) the second converter arrangement is configured to convert the second downlink signal from the second frequency to the first frequency and to re-send it into the cable via the second end,
   (iii) the second converter arrangement is configured to convert a first part of at least a first uplink signal from a third frequency to a fourth frequency and to re-send it into the cable via the second end, and
   (iv) the first converter arrangement is configured to convert the first part of said first uplink signal from the fourth frequency to the third frequency, and
   wherein the first frequency is separated from the second frequency, and wherein the third frequency is separated from the fourth frequency,
   wherein a second part of said first uplink signal is connected directly to the node via a first filter arrangement included in the first converter.

2. The wireless communication arrangement according to claim 1, wherein, for each signal transfer arrangement:
   the first converter arrangement includes a first frequency converter device and the first filter arrangement connected to the first end, the first downlink signal being arranged to be connected to the cable via the first filter arrangement, and the second downlink signal being arranged to be connected to the cable via the first frequency converter device and the first filter arrangement, the first frequency converter device being arranged to convert the second downlink signal from the first frequency to the second frequency, and
   the second converter arrangement includes a second frequency converter device and a second filter arrangement connected to the second end, the second downlink signal being arranged to be fed out from the cable through the second end and back into the cable through the second end via the second filter arrangement, the second frequency converter device and via the second filter arrangement again, the second frequency converter device being arranged to convert the second downlink signal from the second frequency to the first frequency.

3. The wireless communication arrangement according to claim 2, wherein, for each signal transfer arrangement:
   the second frequency converter device is configured to convert the first part of said first uplink signal, having entered the second converter arrangement at the third frequency via the second end, from the third frequency to the fourth frequency, and
   the first frequency converter device is configured to convert the first part of said first uplink signal from the second converter arrangement, from the fourth frequency to the third frequency.

4. The wireless communication arrangement according to claim 2, wherein, for each signal transfer arrangement:
   the second converter arrangement includes a third frequency converter device, configured to convert the first part of said first uplink signal, having entered the second converter arrangement at the third frequency via the second end, from the third frequency to the fourth frequency, and
   the first converter arrangement includes a fourth frequency converter device configured to convert the first part of said first uplink signal from the second converter arrangement, from the fourth frequency to the third frequency.

5. The wireless communication arrangement according to claim 4, wherein at least one of the second frequency converter device and the third frequency converter device is connected to an amplifier.

6. The wireless communication arrangement according to claim 5, wherein at least one of the second frequency converter device and the third frequency converter device is connected to an additional filter.

7. The wireless communication arrangement according to claim 2, wherein each filter arrangement includes a cable port arranged to be connected to a corresponding cable end.

8. The wireless communication arrangement according to claim 1, wherein the first frequency and the third frequency are equal.

9. The wireless communication arrangement according to claim 1, wherein the second frequency and the fourth frequency are equal.

10. The wireless communication arrangement according to claim 2, wherein the second part of said first uplink signal enters said first converter arrangement at the third frequency.

11. The wireless communication arrangement according to claim 1, wherein, for each signal transfer arrangement:
the second converter arrangement is configured to convert a first part of a second uplink signal from a third frequency to a fourth frequency and to re-send it into the cable via the second end; and
the first converter arrangement is configured to convert the first part of the second uplink signal from the fourth frequency to the third frequency.

12. The wireless communication arrangement according to claim 1, wherein, for at least one signal transfer arrangement, the first downlink signal and second downlink signal are constituted by a main downlink signal that has been divided into said first downlink signal and second downlink signal in the corresponding first converter arrangement.

13. The wireless communication arrangement according to claim 1, wherein, for each signal transfer arrangement:
the first converter arrangement includes a first frequency converter device and the first filter arrangement connected to the first end, the first downlink signal being arranged to be connected to the cable via the first filter arrangement, and the second downlink signal being arranged to be connected to the cable via the first frequency converter device and the first filter arrangement, the first frequency converter device being arranged to convert the second downlink signal from the first frequency to the second frequency.

14. The wireless communication arrangement according to claim 1, wherein, for each signal transfer arrangement:
the second converter arrangement includes a first frequency converter device and a first filter arrangement connected to the second end, the second downlink signal being arranged to be fed out from the cable through the second end and back into the cable through the second end via the first filter arrangement, the first frequency converter device and via the first filter arrangement again, the first frequency converter device being arranged to convert the second downlink signal from the second frequency to the first frequency.

15. A method for transferring signals to and from a node via at least one radiating cable having a first end and a second end, the method comprising the steps for each radiating cable:
at the first end of the cable, converting a second downlink signal from a first frequency to a second frequency;
connecting at least a first downlink signal and the second downlink signal to the cable via the first end;
at the first end of the cable, transmitting the first downlink signal at the first frequency on the cable to the second end of the cable;
at the second end of the cable, converting the second downlink signal from the second frequency to the first frequency;
re-sending the second downlink signal into the cable;
converting a first part of at least a first uplink signal from a third frequency to a fourth frequency;
connecting a second part of said first uplink signal directly to the node via a first filter arrangement;
re-sending the first part of said first uplink signal into the cable via the second end; and
converting the first part of said first uplink signal from the fourth frequency to the third frequency,
wherein the first frequency is separated from the second frequency, and wherein the third frequency is separated from the fourth frequency.

16. The method according to claim 15, wherein the second part of said first uplink signal enters a first converter arrangement at the third frequency.

* * * * *